Feb. 1, 1966     L. F. FRANK ETAL     3,232,201
FIBER OPTICAL SCANNING SYSTEM
Filed Aug. 14, 1963
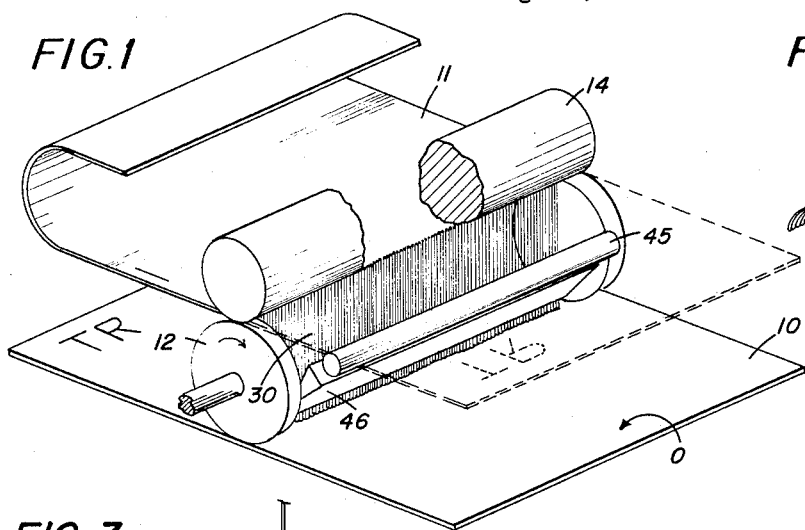
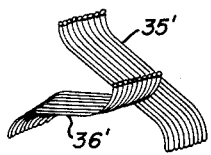
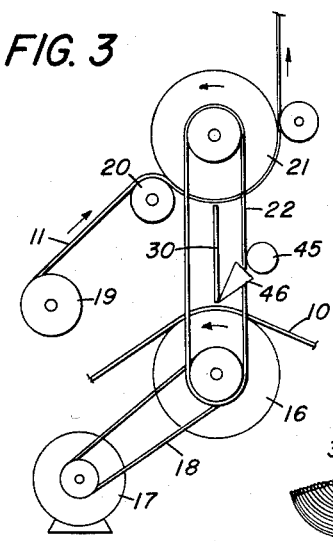
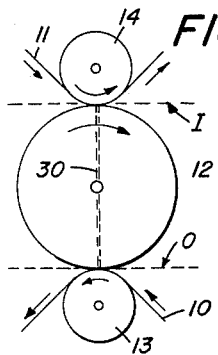
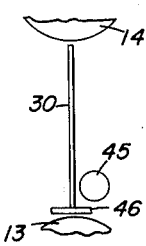
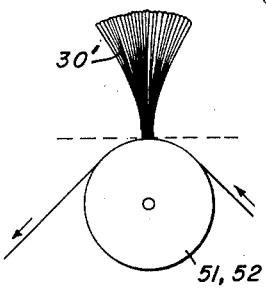
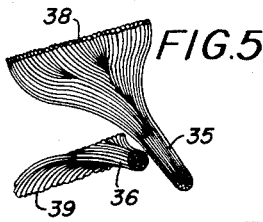
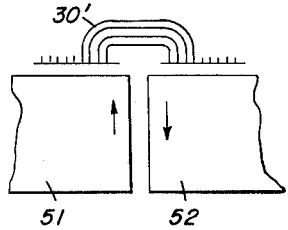
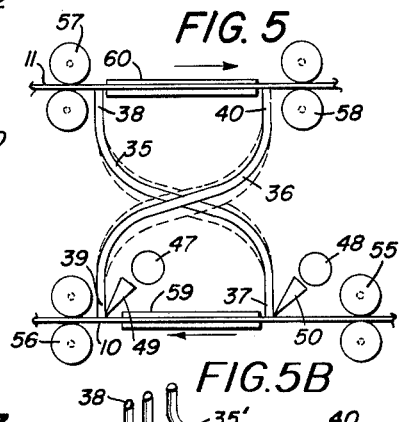
LEE F. FRANK
STEPHEN MICHEL
INVENTORS
BY *R. Frank Smith*
*Lloyd F. Seebach*
ATTORNEY & AGENT 3,232,201
FIBER OPTICAL SCANNING SYSTEM
Lee F. Frank, and Stephen Michel, Rochester, N.Y., assignors to Eastman Kodak Company, Rochester, N.Y., a corporation of New Jersey
Filed Aug. 14, 1963, Ser. No. 302,117
2 Claims. (Cl. 95—75)

The present invention relates to an optical scanning system, and more particularly to an optical system in which a group of fiber optical elements are arranged transversely and between an object and image plane for transmitting line-by-line images of an original to a light-sensitive copy material on which a right reading, light image of the original is formed.

In a conventional contact printing system, an original is placed in contact with a photosensitive material and subjected to intense illumination for exposing an image of the original on the photosensitive surface by transmission of the light through the original so that a right reading image is obtained only when the image on one surface of the original is transmitted through the original to the photosensitive material. Whether the original is contiguous to the photosensitive surface or is transmitted through the original, the material bearing the original image cann not be impervious to light but must be capable of transmitting light so as to permit making of a copy.

Another method of copying is reflux printing wherein a photosensitive material is placed in contact with an original and subjected to intense illumination through the copying material. The image exposure depends on light reflected from the original and a transparent or translucent photosensitve material is required to permit the exposure to be made. The photosensitive material must be of high contrast to differentiate between the reflected light and the transmitted light. A wrong reading image is obtained on the photosensitive material, and to get a right reading image the copy must be viewed through the copying material or the image must be transferred to another support.

In systems utilizing a flow type of reproduction, the original is moved in one direction and the photosensitive material is moved in another direction, and the copy material is usually spaced a considerable distance from the original. Although an image of unit magnification or a reduced image of the original on the copy material can be obtained by the flow system, complex mechanisms and optical systems are required.

In the present invention, the use of fiber optical elements for transmitting line-by-line images of an original to a copy material possesse the distinct advantage that an image of unit magnification is obtained without a complex optical system. In addition, the resolution of the image on the photo sensitive copy material can be varied in accordance with the size of the fiber optical elements. For a given size of fiber optical element, the speed of the original and copy material can be increased by using two sets of fiber optical elements and by offsetting the ends of the elements in one set with respect to the ends of the elements in other set so that two exposures are made in register. With this latter arrangement, the images on the copy material are finally superimposed at the more remote point of the ends of the elements adjacent the copy material.

The primary object of the invention is to provide an optical scanner system comprising fiber optical elements so that a right reading, light image copy of the original can be obtained without the use of any other optical system.

Another object of the invention is to provide an optical scanner system comprising fiber optical elements which are disposed between spaced object and image planes.

Still another object of the invention is to provide an optical scanner system for photocopying in which the original and copy are moved in opposite directions trough spaced parallel planes with an array of fiber optical elements disposed between the planes and transverse to the path of movement of the original and copy material.

An still another object of the invention is to provide an optical scanner system which is relatively simple and inexpensive to manufacture and which can be readily adapted for copying originals which can be transparent or opaque and of any length.

These and other objects and advantages will be apparent to those skilled in the art by the description which follows.

Reference is now made to the accompanying drawing wherein like reference numerals and letters designate like parts and wherein:

FIG. 1 is a perspective view showing the spaced relation of the copy material to the original and an array of fiber optical elements disposed between the copy material and the original;

FIG. 2 is a side elevation view of the rollers for moving the original and copy material shown in FIG. 1;

FIG. 3 is a diagrammatic view showing an arrangement by which the original and copy can be moved continuously past the scanning station and the drive means therefor;

FIG. 4 is a partial elevation view of another embodiment of a system for illuminating the original;

FIG. 5 is a side elevation showing an arrangement of the fiber optical elements between the object and image planes for permitting a higher rate of movement of the original and copy material;

FIG. 5A is a partial perspective view showing one side of the ends of the elements disclosed in FIG. 5;

FIGS. 5B and 5C are partial perspective views showing other arrangements of the element disclosed in FIG. 5; and FIGS. 6 and 7 are side and elevation views of another embodiment of the invention in which the object and image planes are spaced for each other in horizontal direction.

With reference to FIGS. 1 and 2, an original 10 is moved in a horizontal plane which may be referred to as an object plane O. Spaced from plane O and parallel thereto a copy material 11 is moved through an image plane and in a direction opposite to that of the original 10. As shown in FIG. 2, the original 10 and copy 11 are moved in opposite directions by means of a pair of rollers 12 and rollers 13 and 14 which are positioned diametrically from each other relative to rollers 12. The rollers 12 preferably engage only the edges of the original 10 and copy material 11 as shown in FIG. 1 and the rollers 13 and 14 can be either a solid roller as shown in FIG. 1, or each a pair of spaced rollers aligned with and in engagement with the spaced rollers 12. The rollers 12, 13 and 14 are preferably made of rubber in order to provide a positive drive for the original and copy material.

With reference to FIG. 3, the original 10 is moved by a pair of rollers 16 which are rotated in a counterclockwise direction by a motor 17 which is coupled to rollers 16 by a belt or sprocket 18. The copy material 11 is fed from a supply roll 19 over a guide roll 20 and around a pair of rollers 21 so as to move the copy material in a direction opposite to that of the original 10. This is accomplished by interconnecting rollers 16 with rollers 21 by a belt or chain 22. The motor 17 can be connected to any one of rollers 12, 13 or 14, as shown in FIG. 2, to provide the same type of drive for moving the original and copy material in opposite directions.

An array of fiber optical elements 30 are arranged transverse to the paths of movement of the original and copy material as shown in FIG. 1. The array of elements is one element thick and each element is optically insulated from the other and is capable of transferring information from the original to the copy material as scanning proceeds. The line of elements can be as long as one dimension of the original or can be longer than one dimension of the original in which case the line of elements can be arranged diagonally across the original and copy and one scan would cover the entire area and produce a copy of the same size simultaneously. With this latter arrangement, the area scanned by each fiber overlaps the areas scanned by the adjacent fibers and produces a more even exposure. When the array of elements 30 is arranged diagonally to scan an original, the end of the array adjacent to the copy material must also be on a diagonal but in the opposite direction. The resolution and speed of the system is determined by the size of the elements, and the smaller the size, the better the resolution, but with such increase in resolution, the rate of movement of the original and copy material must be decreased proportionally. Since the original 10 and copy material 11 are moved in opposite directions, the image formed by the elements on the copy material is right reading and does not require any reflex copying and subsequent transfer of the image to obtain proper left-to-right orientation. Because a reflex printing step, which requires a high contrast copy material, is not required, lower contrast, opaque copy materials can be used. Also, because the manner of scanning is limited or is confined to a line-by-line increment of the original, the system lends itself to continuous scanning of the original and the length of the original is not limited.

In FIG. 5, an embodiment of the invention is shown in which two groups of fiber optical elements 35 and 36 are arranged between the original 10 and copy material 11. By using two groups of fibers, which are arranged as shown in FIG. 5, two exposures are made in registry, thereby permitting the speed of the original and of the copy material to be increased. The elements 35 are formed so that the end 37 of each element that is adjacent the original is displaced from the end 38, which is adjacent the copy material, in a direction corresponding to the movement of the copy 11. In a like manner, the end 39 of each of the elements 36 is displaced from the end 40 in the direction of movement of the original 10. The above displacements are made so that the distance between ends 37 and 39 measured along the original is identical to the distance between ends 38 and 40 measured along the copy material. The elements 35 and 36 are two independenly complete arranys and each scans and exposes a complete linear image of the original. The original is first scanned by the ends 37 and the copy material is exposed by ends 38 of elements 35. As the same linear portion of the original is moved past the ends 39 of elements 36, the copy material is moved so that the previous exposure by end 38 is contiguous to ends 40. Consequently, the exposure made by elements 36 is made in registry with the exposure made by ends 38 of elements 35. The original 10 is moved in the direction of the arrow by two pairs of suitable rollers 55 and 56, each pair being arranged adjacent the ends 37 and 39, respectively. Similar rollers 57 and 58 move the copy material 11 in the opposite direction, the rollers 55, 56, 57 and 58 being interconnected to a suitable drive means in a known manner so that the original and copy material are moved in synchronism. Suitable guide plates 59 and 60 are arranged intermediate the ends 37, 39 and 38, 40 respectively, to support the original and copy material as they are moved in their respective paths and through their respective scanning and exposure stations.

Since the fibers comprising the elements 35 and 36 are optically insulated from each other, the elements can be bundled to permit crossing over as shown in FIG. 5A.

The fibers comprising elements 35' and 36' can also be arranged as shown in FIGS. 5B and 5C to scan spaced elemental portions or a partial line of the original in each of two spaced scanning stations, that is, elements 35' and 36' can each have half the number of fibers required to scan the width of the original which are spaced and alternately arranged as in FIG. 5B or arranged contiguously across each half of the width of the original as in FIG. 5C. A portion of the linear image of the original that is being scanned is first scanned by the ends 37, and those portions that are not scanned by these ends are subsequently scanned by the ends 39. The portions of the image transmitted by ends 37 therefor expose a corresponding part on the copy material 11 in accordance with the position of the ends 38. When the same linear portion of the original is moved past the ends 39, this portion is transmitted to the ends 40 to complete the linear image transversely of the copy material 11. In order to accomplish this result, it is necessary that the ends 37 and 40, as well as the ends 39 and 38, be aligned with each other. The elements 35' and 36' between the ends can take any shape or form to provide the optimum result.

In the embodiments of the invention described thus far, the original is illuminated by source 45 which can be positioned adjacent the path of movement of the original 10 and the array of fiber optical elements 30, as shown in FIG. 3. In order to increase the intensity of illumination incident on the original 10, an optical wedge 46, preferably of a triangular cross-section, as shown in FIGS. 1 and 3, can be interposed between the source 45 and the ends of the elements 30 adjacent the original 10 with the apex of the wedge in optical contact with the array of elements. In another embodiment for illuminating the original 10, the source 45 can be placed above an optical plate 46 which is arranged between the ends of the elements 30 and the original 10, as shown in FIG. 4. The illuminating system disclosed in FIGS. 1 and 3 can also be utilized in the embodiment of the invention shown in FIG. 5 by arranging the sources 47 and 48 adjacent the ends 37 and 39 with an optical prism 49 and 50 interposed in the same manner as shown in FIG. 3 between the sources and the original 10. In an arrangement in which spaced rollers 13 and 14 are used and the original is transparent or translucent, the light source 45 can be positioned beneath the original and in alignment with the array of elements 30.

The use of such fiber optical elements also lends itself to an application in which the original 10 and copy 11 are moved in opposite directions over or by rollers 51 and 52 which are co-axially aligned. In this embodiment of the invention, the array of fiber optical elements 30' must be formed so as to extend from the adjacent edges of the rollers 51 and 52 to the outer extremities thereof as shown in FIGS. 6 and 7.

The size of the optical elements 30 and 30', as mentioned hereinabove, can be varied in accordance with the image resolution that is required. Also, the elements per se can be circular or of any non-circular shape in cross-section without impairing the quality of the image exposed on the copy material 11. Also, such elements can be made of glass or suitable plastic materials, such as clear methyl methacrylate resin or any other type of optically transparent material. While several embodiments of the invention have been described hereinabove, the invention is not to be limited to these disclosures, but is of a scope as defined by the appended claims.

The embodiments of the invention in which an exclusive property or privilege is claimed are defined as follows:

1. A countercurrent scanning system for producing a right reading, light image copy of an original, the combination comprising:
   an object plane;
   an image plane parallel to and spaced from said object plane;
   means for synchronously moving said original in a path through said object plane in one direction and a light-sensitive copy material in a path through said image plane in the opposite direction;

means arranged adjacent said object plane for illuminating said original;

a first array of optically insulated, light transmitting fiber optical elements arranged transverse to the paths of movement of said original and said copy material and between said object and image planes with the ends thereof adjacent said image plane displaced, in the direction of movement of said original, relative to the ends adjacent said object plane for successively transmitting line-by-line elemental images of said original to said copy material; and a second array of optically insulated, light transmitting elements arranged transverse to the paths of movement of said original and said copy material and between said object and image planes adjacent said first array, the ends of said second array adjacent said object plane being aligned with the ends of said first array adjacent said image plane and the ends of said second array adjacent said image plane being aligned with the ends of said first array adjacent said object plane for successively transmitting line-by-line elemental images of said original to said copy material wherein the thickness of each array of fiber optical elements at the ends of each array is the thickness of a single fiber optical element.

2. A countercurrent scanning system in accordance with claim 1 wherein the elements of said first array and said second array are arranged in contiguous relation transversely of half the paths of movement of said original and said copy material for successively transmitting partial line-by-line elemental images of said original to said copy material.

References Cited by the Examiner
UNITED STATES PATENTS

| | | | |
|---|---|---|---|
| 2,198,115 | 4/1940 | John | 88—1 |
| 3,060,805 | 10/1962 | Brumley | 88—24 |
| 3,060,806 | 10/1962 | Lewis et al. | 88—24 |
| 3,125,013 | 3/1964 | Herrick et al. | 95—75 |

EVON C. BLUNK, *Primary Examiner.*